(12) United States Patent
Roeder

(10) Patent No.: US 11,124,303 B2
(45) Date of Patent: Sep. 21, 2021

(54) SEAT INDEXING SYSTEMS AND METHODS

(71) Applicant: THE BOEING COMPANY, Chicago, IL (US)

(72) Inventor: Raymond Roeder, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 96 days.

(21) Appl. No.: 16/368,925

(22) Filed: Mar. 29, 2019

(65) Prior Publication Data

US 2020/0307808 A1  Oct. 1, 2020

(51) Int. Cl.
*B60N 2/06* (2006.01)
*B64D 11/06* (2006.01)

(52) U.S. Cl.
CPC ...... *B64D 11/0696* (2013.01); *B64D 11/0639* (2014.12)

(58) Field of Classification Search
CPC ...... B64D 11/0696; B60P 7/0815; B60P 7/08; G09F 7/10; G09F 7/08; G09F 2023/005
USPC ..................................................... 244/118.6
See application file for complete search history.

(56) References Cited

U.S. PATENT DOCUMENTS

| | | | | |
|---|---|---|---|---|
| 3,259,102 | A * | 7/1966 | Rex ........................... | G09F 7/00 116/309 |
| 5,310,297 | A * | 5/1994 | Benjamin ................ | B64D 9/00 244/118.1 |
| 6,561,458 | B1 * | 5/2003 | Lowery .............. | B64D 11/0696 244/118.6 |
| 6,918,722 | B1 * | 7/2005 | Girardin ............... | B60P 7/0815 410/105 |
| 7,607,736 | B2 * | 10/2009 | Ponzo De Siqueira ..................... | B64D 11/0696 244/118.1 |
| 7,713,009 | B2 | 5/2010 | Hudson | |
| 7,785,053 | B2 | 8/2010 | Hudson | |
| 8,128,326 | B2 | 3/2012 | Hudson | |
| 8,910,907 | B2 * | 12/2014 | Gonnsen .............. | B64D 11/064 244/118.6 |
| 8,920,085 | B2 | 12/2014 | Hudson | |
| 9,093,004 | B2 * | 7/2015 | Pearson ................... | A47C 1/13 |
| 9,567,086 | B2 * | 2/2017 | Siegmeth ........... | B64D 11/0696 |
| 2006/0032979 | A1 * | 2/2006 | Mitchell .......... | B64D 11/00155 244/118.6 |
| 2006/0104740 | A1 * | 5/2006 | Girardin ............... | B60P 7/0815 410/105 |
| 2007/0063122 | A1 * | 3/2007 | Bowd ................ | B64D 11/0696 248/429 |

(Continued)

FOREIGN PATENT DOCUMENTS

EP          1132291 A2 *  9/2001  ............. B64D 45/00

OTHER PUBLICATIONS

U.S. Appl. No. 16/365,788, filed Mar. 27, 2019.

(Continued)

*Primary Examiner* — Timothy J Brindley
(74) *Attorney, Agent, or Firm* — The Small Patent Law Group LLC; Joseph M. Butscher

(57) ABSTRACT

A seat indexing system and method for an internal cabin of a vehicle include a seat assembly including one or more indexing indicators, a seat track, and one or more indexing guides on the seat track. The indexing indicator(s) cooperate with the indexing guide(s) to indicate one or more desired positions for the seat assembly in relation to the seat track.

20 Claims, 8 Drawing Sheets

(56) References Cited

U.S. PATENT DOCUMENTS

| | | | |
|---|---|---|---|
| 2014/0125355 A1* | 5/2014 | Grant | G01R 27/2605 |
| | | | 324/629 |
| 2015/0192162 A1* | 7/2015 | Jones | B64D 11/0696 |
| | | | 403/27 |
| 2015/0213695 A1* | 7/2015 | Carlson | B62B 3/06 |
| | | | 340/815.4 |
| 2016/0096626 A1* | 4/2016 | Hoch | B64D 11/06395 |
| | | | 244/118.6 |
| 2016/0101868 A1* | 4/2016 | Daouk | B60N 2/0725 |
| | | | 297/463.1 |
| 2017/0341756 A1* | 11/2017 | Fuerstenberg | B64D 11/0639 |
| 2019/0111806 A1* | 4/2019 | Camuti | B60N 2/002 |
| 2019/0308670 A1* | 10/2019 | Schulz | B60N 2/07 |
| 2020/0039652 A1* | 2/2020 | Guillet | B64D 11/0696 |
| 2020/0231286 A1* | 7/2020 | Movsesian | B64D 11/06 |

OTHER PUBLICATIONS

U.S. Appl. No. 16/365,777, filed Mar. 27, 2019.
U.S. Appl. No. 16/529,921, filed Aug. 2, 2019.
U.S. Appl. No. 16/529,935, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/367,314, filed Mar. 28, 2019.
U.S. Appl. No. 16/368,934, filed Mar. 29, 2019.
U.S. Appl. No. 16/671,238, filed Nov. 1, 2019.

\* cited by examiner

SEAT INDEXING SYSTEMS AND METHODS

FIELD OF EMBODIMENTS OF THE DISCLOSURE

Embodiments of the present disclosure generally relate to seat indexing systems and methods, and more particularly, to seat indexing systems and methods that allow for efficient and reliable positioning of seats within an internal cabin of a vehicle.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

As a commercial aircraft is being manufactured, passenger seats are secured within an internal cabin. Because a commercial aircraft may include different sections having different pitches between rows of seats, the process of positioning and securing seats at defined positions within an internal cabin is time and labor intensive. For example, in order to position a seat at a desired location within an internal cabin, an individual typically first measures a distance from a particular location to the define location for the seat.

Additionally, after the aircraft is manufactured and is in service, between flights of the aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section. When the seats are reconfigured, care it taken to ensure that the seats are located at proper positions. Also, when seats are relocated, neighboring structures and components (such as floor mounted stowage, class dividing panels, closets, and the like) are often adjusted in order to accommodate the relocation.

As noted, the process of properly positioning seats within an internal cabin is time and labor intensive. If one or more seats are positioned at even slightly positions than preferred, defined locations, one or more sections within a commercial aircraft may be affected, in that spacing between different certain rows may not be as intended. Further, there is a relatively short time until a subsequent flight, there may not be sufficient time to adjust the seats to new positions.

SUMMARY OF THE DISCLOSURE

A need exists for an efficient system and method for identifying proper locations for seats within an internal cabin of a vehicle. Further, a need exists for a system and method that allow for quick and efficient adjustment of seats within an internal cabin.

With those needs in mind, certain embodiments of the present disclosure provide a seat indexing system for an internal cabin of a vehicle. The seat indexing system includes a seat assembly including one or more indexing indicators, a seat track, and one or more indexing guides on the seat track. For example, the indexing guide(s) may be formed on the seat track, or separately coupled thereto. The indexing indicator(s) cooperate with the indexing guide(s) to indicate one or more desired positions for the seat assembly in relation to the seat track. The indexing indicator(s) align with the indexing guide(s) to indicator the desired position(s) for the seat assembly in relation to the seat track.

In at least one embodiment, the indexing guide(s) are formed on or in the seat track. For example, the indexing guides(s) include one or more depressions formed into the seat track. The depressions may be formed into at least one retaining lip of the seat track. The indexing guides(s) may include applied visual indicia.

A plurality of indexing indicators may be positioned on an outer surface of the seat assembly. In at least one embodiment, the plurality of indicators provide an indexing scale. In at least one embodiment, the indexing indicator(s) are positioned on a spanner bar of the seat assembly. The indexing indicator(s) may correspond to one or more particular seat pitch positions in relation to the seat track.

The seat indexing system may also include a slider that is configured to move in relation to one or both of the seat assembly or the seat track. In at least one embodiment, the slider includes an indicator pointer that extends upwardly from a top surface. The indicator pointer is configured to slide over an outer surface of a spanner bar of the seat assembly. A guide protrusion extends downwardly from a bottom surface. The indicator pointer and the guide protrusion cooperate with the indexing indicator(s) and the indexing guide(s) to indicate the desired position(s) for the seat assembly in relation to the seat track. The guide protrusion is configured to seat into the indexing guide(s).

In at least one embodiment, the slider includes a pin passage that slidably retains an indicator pin having a distal tip connected to a head through a shaft. The head extends above a top surface of a main body of the slider when the indicator pin is not aligned with the indexing guide(s). The head recedes into the pin passage as the distal tip seats into the indexing guide(s).

Certain embodiments of the present disclosure provide a seat indexing method for an internal cabin of a vehicle that includes providing one or more indexing indicators on a seat assembly, providing one or more indexing guides on a seat track, aligning the indexing indicator(s) with the indexing guide(s), and indicating, by the aligning, one or more desired positions for the seat assembly in relation to the seat track.

In at least one embodiment, the providing the indexing guide(s) includes forming one or more depressions into the seat track. In at least one embodiment, the providing the indexing indicator(s) on the seat assembly includes positioning the indexing indicator(s) on a spanner bar of the seat assembly.

In at least one embodiment, the seat indexing method also includes providing a slider, and moving the slider in relation to one or both of the seat assembly or the seat track. In at least one embodiment, the seat indexing method also includes aligning an indicator pointer and a guide protrusion of the slider with the indexing indicator(s) and the indexing guide(s), and indicating, by the aligning the indicator pointer and the guide protrusion, the desired position(s) for the seat assembly in relation to the seat track. In at least one embodiment, the providing the slider includes slidably retaining an indicator pin having a distal tip connected to a head through a shaft within a pin passage.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat indexing systems and methods that include at least one indexing feature that allows for quick and easy identification of seat locations within an internal cabin of a vehicle. In short, an individual is able to verify accuracy of a seat placement, which may be confirmed via at least one visual indication or feedback feature. Embodiments of the present disclosure provide indexing systems and methods that ensure that a seating configuration within an internal cabin of a vehicle, such as a commercial aircraft, is regulatory authority certified and desirable.

Figure 1:
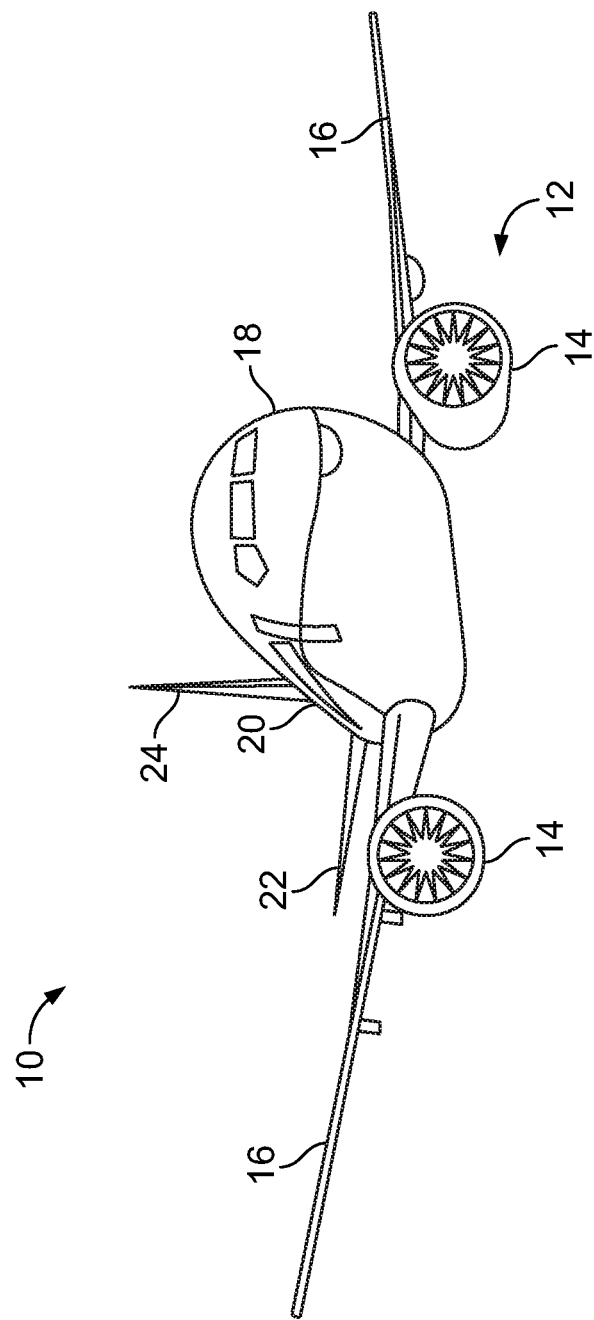
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
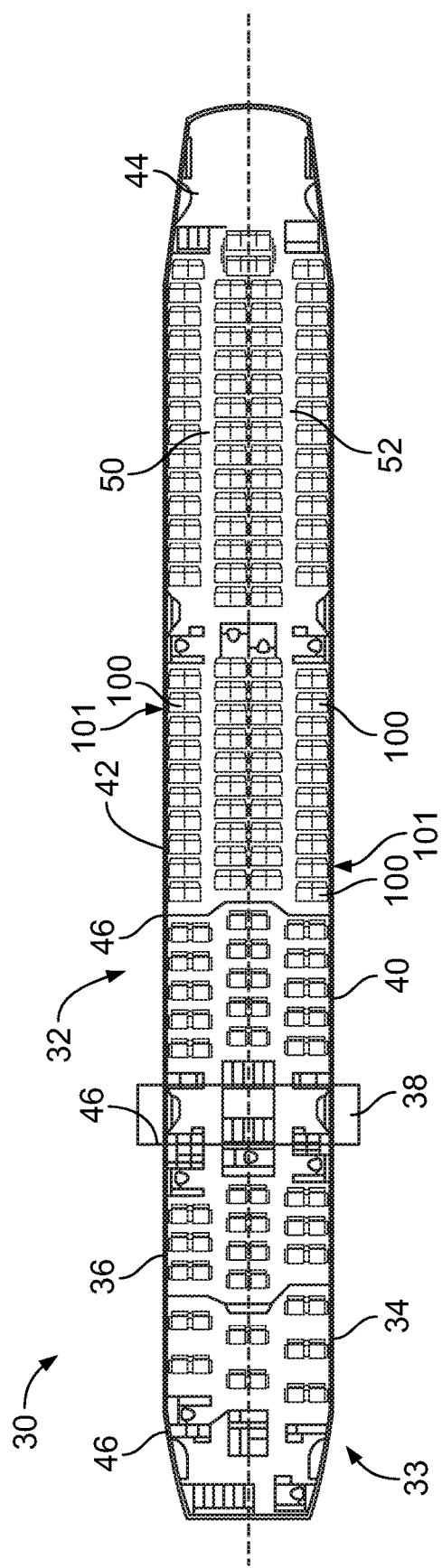
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101.

Figure 2B:
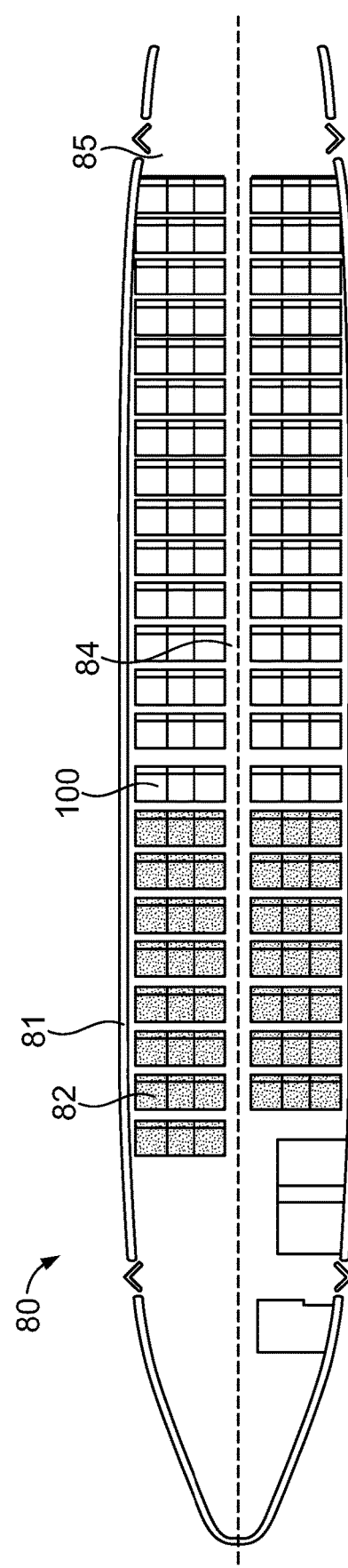
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
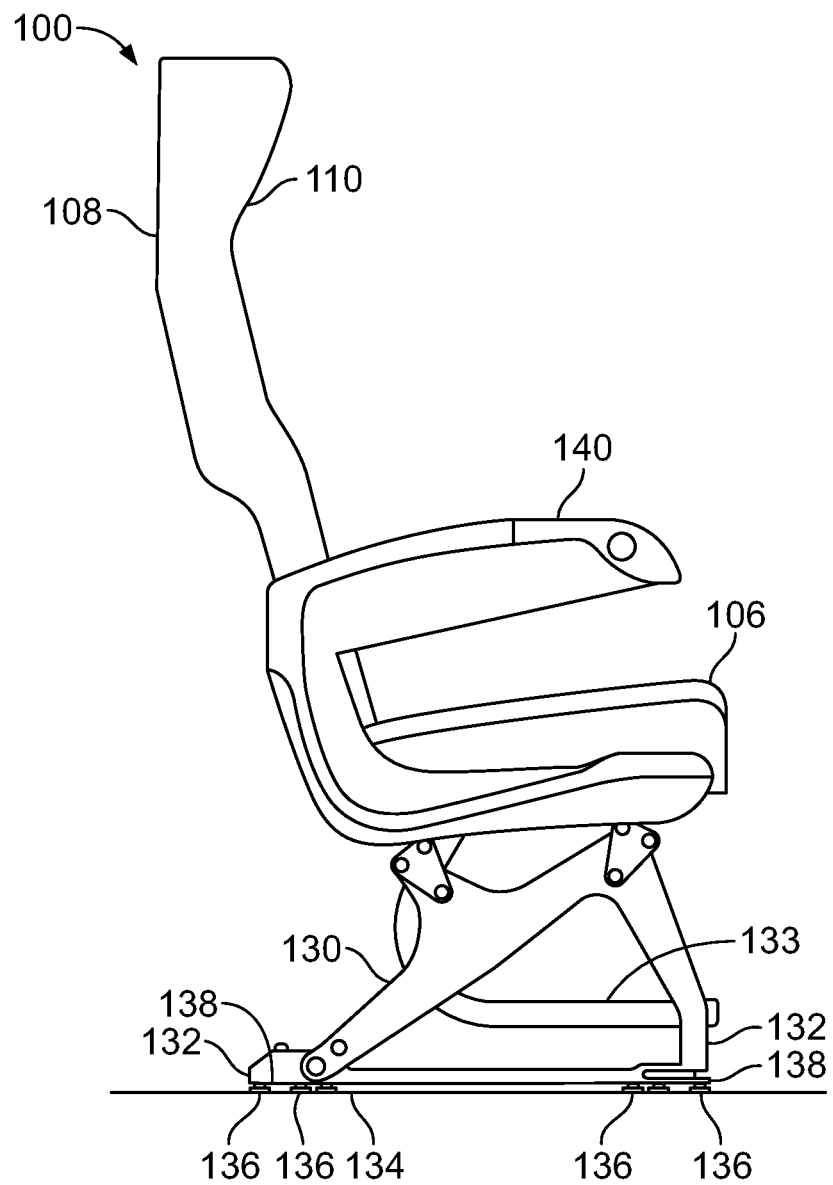
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

Figure 4:
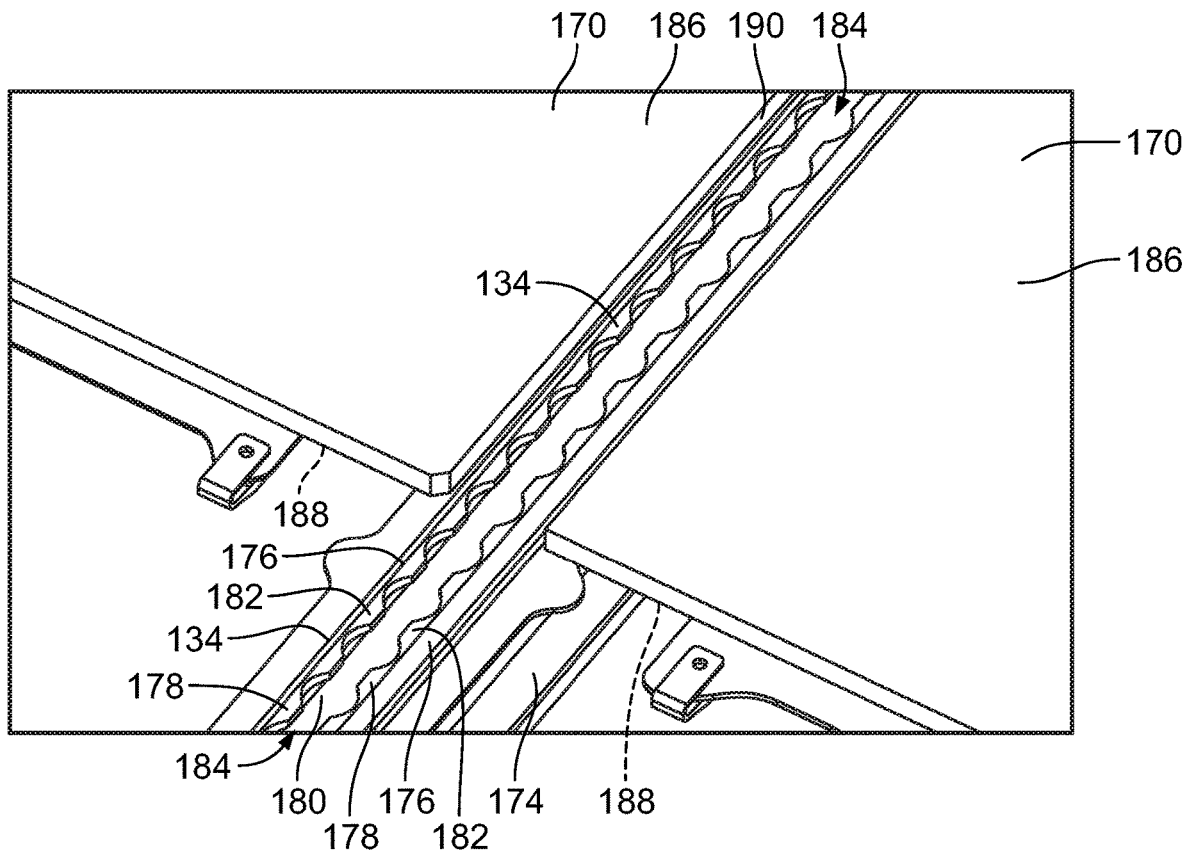
FIG. 4 illustrates a perspective top view of a seat track secured between floor panels, according to an embodiment of the present disclosure.

FIG. 4 illustrates a perspective top view of the seat track 134 secured between floor panels 170, according to an embodiment of the present disclosure. The seat track 134 includes a base 174 and lateral walls 176 extending upwardly from the base 174. A retaining lip 178 inwardly extends from a top end of each lateral wall 176, such as at a ninety degree angle. The retaining lips 178 cooperate to form a series of expanded openings 180 and retaining arms 182 over a track channel 184. The expanded openings 180 and retaining arms 182 alternate over a length of the seat track 134. That is, two expanded openings 180 are separated by a retaining arm 182.

The floor panels 170 include upper planar support surfaces 186 opposite from lower surfaces 188. The upper planar surface surfaces 186 connect to the lower surfaces 188 at edges, such as interior edges 190.

Figure 5:
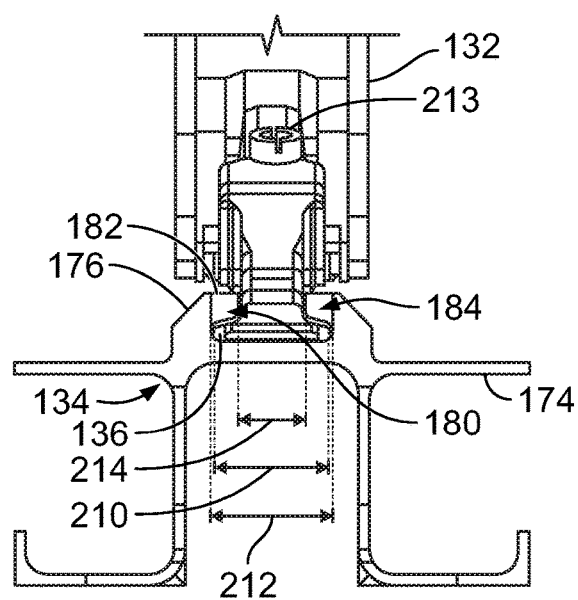
FIG. 5 illustrates an end view of a securing stud within a track channel of a seat track, according to an embodiment of the present disclosure.

FIG. 5 illustrates an end view of a securing stud 136 within a track channel 184 of a seat track 134, according to an embodiment of the present disclosure. Referring to FIGS. 3-5, the securing studs 136 of the seat assembly 100 may have a circular cross section and a width 210 that is less than a width 212 of the expanded openings 180. The width 210 is greater than a width 214 of the opening between opposed retaining arms 182. As such, when the securing studs 136 are positioned directly beneath the retaining arms 182, the securing studs 136 are locked in position, such that they are unable to eject through the opening between the retaining arms 182, thereby securely coupling the seat assembly 100 to the seat track 134. In contrast, when the securing studs 136 are shifted into the track channel 184 below or into the expanded openings 180, the securing studs 136, and therefore the legs 132 of the seat assembly 100, may be lifted out of the seat track 134.

In order to adjust the seat assembly 100 to a different longitudinal position, a lock fitting 213 (such as a bolt or other such fastener) is manipulated to unlock the legs 132. For example, the lock fitting 213 may be loosened such that a distal end no longer engages a portion of the seat track 134. Optionally, the seat assembly 100 may not include lock fittings.

After the lock fitting 213 disengages from the seat track 134, the seat assembly 100 may be longitudinally shifted in relation to the seat track 134. The seat assembly 100 is shifted so that the securing studs 136 are no longer underneath the retaining arms 182, but are instead within the expanded openings 180. After the securing studs 136 are in the expanded openings 180, the seat assembly 100 may be removed from the seat track 134, and/or moved to a different position on the seat track 134 via a seat adjustment system.

Figure 6:
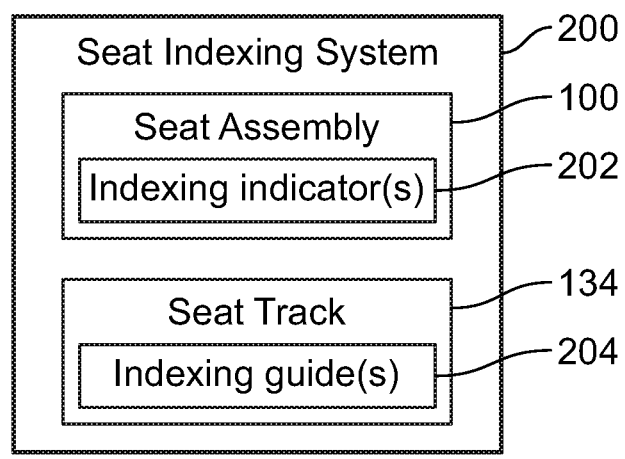
FIG. 6 illustrates a schematic block diagram of a seat indexing system, according to an embodiment of the present disclosure.

FIG. 6 illustrates a schematic block diagram of a seat indexing system 200, according to an embodiment of the present disclosure. In at least one embodiment, the seat indexing system 200 includes one or more indexing indicators 202 on a seat assembly 100, and one or more indexing guides 204 on a seat track 134. In order to properly position the seat assembly 100 within an internal cabin, the indexing indicator(s) 202 are aligned with the indexing guide(s) 204 of the seat track 134. As such, the seat indexing system 200 allows for quick, efficient, and easy positioning, inspection, and verification of the seat assembly 100 at a desired position within the internal cabin.

As described herein, embodiments of the present disclosure provide the seat indexing system 200 for an internal cabin of a vehicle. The seat indexing system includes a seat assembly 100 including one or more indexing indicators 202, and a seat track 134 including one or more indexing guides 204. The indexing indicator(s) 202 cooperate with the indexing guide(s) 204 to indicate one or more desired positions for the seat assembly 100 in relation to the seat track 134.

Figure 7:
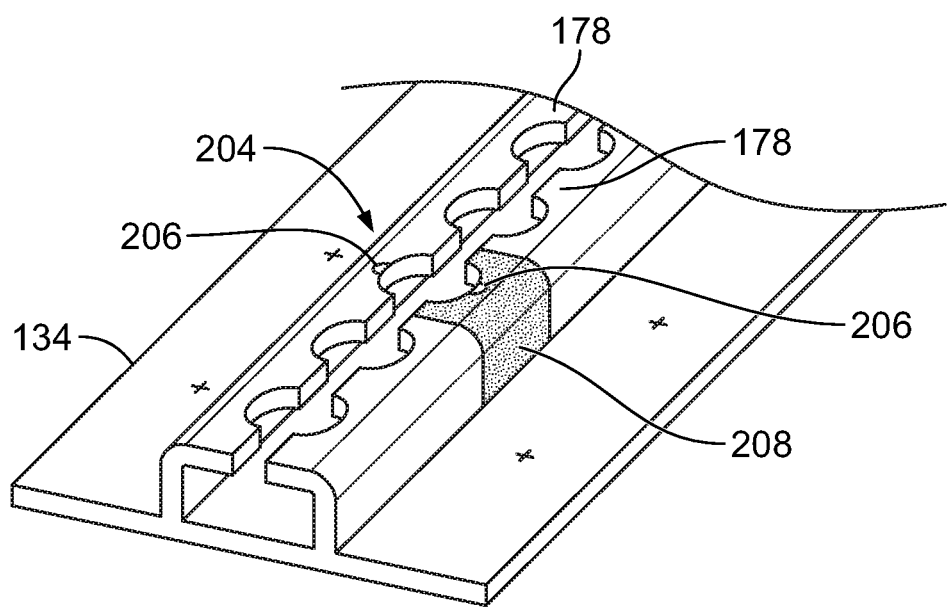
FIG. 7 illustrates a perspective top view of a seat track, according to an embodiment of the present disclosure.
Figure 8:
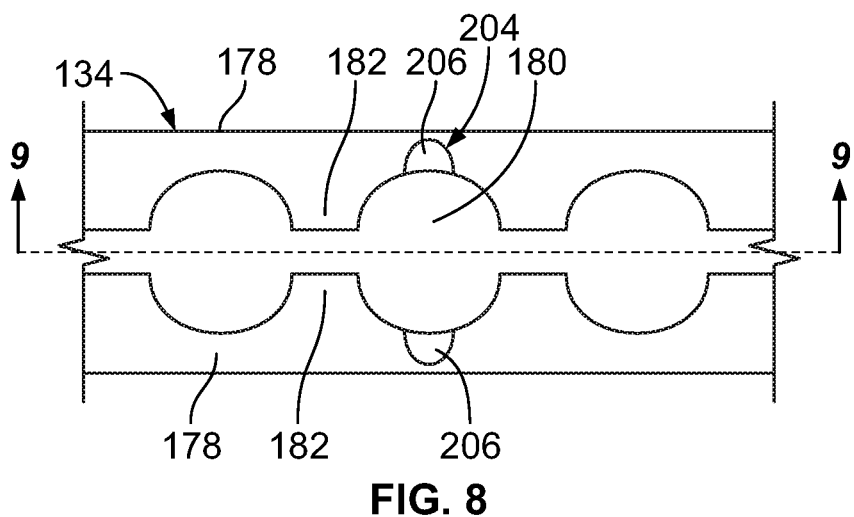
FIG. 8 illustrates a top view of a portion of the seat track.
Figure 9:
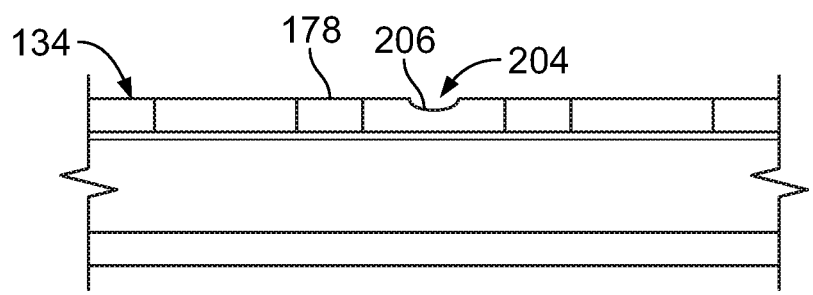
FIG. 9 illustrates a cross-sectional view of the portion of the seat track through line 9-9 of FIG. 8.

FIG. 7 illustrates a perspective top view of the seat track 134, according to an embodiment of the present disclosure. FIG. 8 illustrates a top view of a portion of the seat track 134. FIG. 9 illustrates a cross-sectional view of the portion of the seat track 134 through line 9-9 of FIG. 8.

Referring to FIGS. 7-9, an indexing guide 204 is formed on and/or in the seat track 134. Optionally, the indexing guide 204 may be separately coupled to the seat track 134, such as via an indexing insert. As shown, the indexing guide 204 may be proximate to an expanded opening 180 of the seat track 134. Optionally, the indexing guide 204 may be at various other portions of the seat track 134. In at least one embodiment, the seat track 134 includes numerous indexing guides 204 spaced apart over a length of the seat track 134.

In at least one embodiment, the indexing guide 204 includes a depression 206, such as a cut-out, relief area, divot, hole, perforation, notch, or other such recess, formed into one or both of the retaining lips 178. As shown in FIGS. 7-9, the indexing guide 204 may include two aligned depressions 206 formed in the retaining lips 178 on opposite sides of an expanded opening 180. Optionally, the indexing guide 204 may include one of the depressions 206.

The depressions 206 provide readily visual features on the seat track 134. That is, the depressions 206 show clear differences in the top surface of the retaining lips 178 that clearly differentiate from the remaining flat surfaces of the retaining lips 178.

Optionally, instead of the depressions 206, the indexing guide 204 may include applied visual indicia 208 (as shown in FIG. 7), such as text, graphics, a color-coded surface, and/or the like. For example, the applied visual indicia 208 may be printed, painted, or the like onto the seat track 134. In at least one embodiment, the indexing guide 204 includes one or more depressions 206 and one or more applied visual indicators 208. The depressions 206 provide visual and tactile indicia, in that they may be discerned through sight and touch differences, while the applied visual indicia 208 provide visual indicia.

In at least one embodiment, the indexing guide(s) 204 may formed on an indexing insert, which may be coupled to the seat track 134. For example, the indexing insert may be disposed on the seat track 134 to form the indexing guide(s) 204. That is, the indexing guide(s) 204 may be formed by a separate insert, instead of forming the indexing guide(s) 204 directly on the seat track 134. In at least one embodiment, the indexing insert could include depressions or raised features that cooperate with the indexing indicator(s) 202, as described herein.

Figure 10:
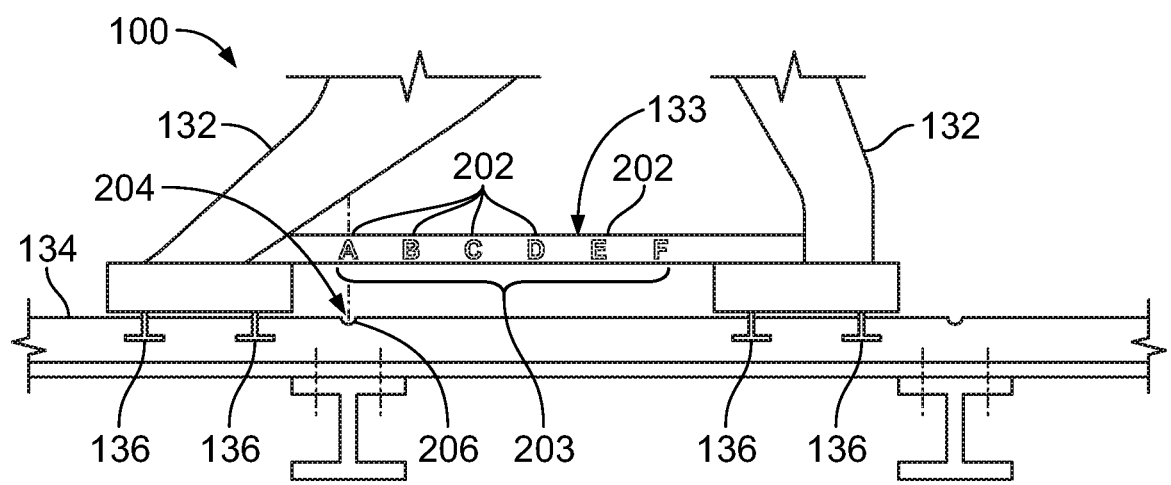
FIG. 10 illustrates a simplified lateral view of a seat assembly positioned on a seat track, according to an embodiment of the present disclosure.

FIG. 10 illustrates a simplified lateral view of the seat assembly 100 positioned on the seat track 134, according to an embodiment of the present disclosure. As shown, the seat assembly 100 includes a plurality of indexing indicators 202. The indexing indicators 202 are positioned on an outer, viewable surface of the spanner bar 133. Optionally, the indexing indicators 202 may be located at other areas of the seat assembly 100, such as the legs 132.

In at least one embodiment, the indexing indicator 202 corresponds to a particular seat pitch position in relation to the seat track 134. Each indexing indicator 202 may be denoted by a letter (as shown), text, a number, an arrow, and/or the like. As shown, seat assembly 100 includes five different indexing indicators 202 (thereby forming an indexing scale 203) each of which represents a different position on the seat track. For example, the seat indicator 202 A corresponds to a first pitch or other such position on the seat track 134, the seat indicator 202 B corresponds to a second pitch or other such position on the seat track 134 that differs from the first pitch, and so on. The seat assembly 100 may include more or less indexing indicators 202 than shown.

In order to properly position the seat assembly 100 at a desired position on the seat track 134, the seat assembly 100 is moved relative to the seat track 134 until the desired indexing indicator 202 (such as indexing indicator A, as shown in FIG. 10) is aligned with the indexing guide 204, such as the depression 206. When the desired indexing indicator 202 is positioned over the indexing guide 204 (for example, vertically aligned), a readily viewable indication of proper seat alignment is attained. That is, an individual is able to readily discern proper positioning of the seat assembly 100 on the seat track 134 in response to the desired indexing indicator 202 being aligned with the indexing guide 204. After the desired indexing indicator 202 is aligned with the indexing guide 204, the seat assembly 100 is secured to the seat track 134, such as via the securing studs 136.

Figure 11:
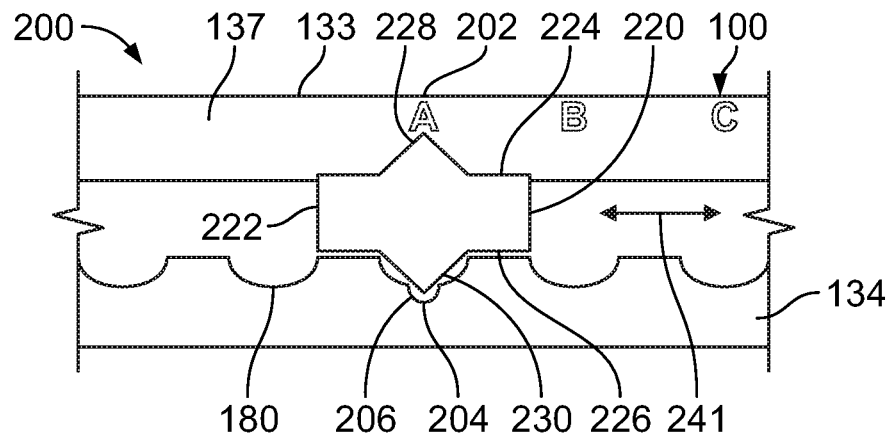
FIG. 11 illustrates a lateral view of the seat indexing system, according to an embodiment of the present disclosure.

FIG. 11 illustrates a lateral view of the seat indexing system 200, according to an embodiment of the present disclosure. In this embodiment, the seat indexing system 200 includes a slider 220. The slider 220 may be a separate piece that fits between the spanner bar 133 and the seat track 134. In at least one other embodiment, the slider 220 is slidably retained by the spanner bar 133 or the seat track 134.

The slider 220 includes a main body 222 (such as a block, bracket, sheath, sleeve, or the like) having a top surface 224 connected to a bottom surface 226. An indicator pointer 228, such as a pointed projection, extends upwardly from the top surface 224, and is configured to slide over an outer surface 137 of the spanner bar 133. A guide protrusion 230, extends downwardly from the bottom surface 226. The guide protrusion 230 is sized and shaped to fit into the depression 206. For example, the guide protrusion 230 may conform to the shape of the depression 206.

As the slider 220 slides in relation to the spanner bar 133 and the seat track 240 in the direction of arrows 241, upon passing over the depression, the guide protrusion 230 seats into the depression 206, thereby providing an audile indication (such as a click) and a visual indication (such as vertical shifting of the slider 220) that the slider 220 is at a desired position. The seat assembly 100 is then shifted so that the desired indexing indicator 202 aligns with the indicator pointer 228, thereby providing a readily discernable indication that the seat assembly 100 is located at the desired position.

In at least one embodiment, the slider 220 shown and described with respect to FIG. 11 is used in conjunction with the seat indexing system 200 shown in FIG. 10.

Referring to FIGS. 10 and 11, in at least one other embodiment, the slider 220 may be fixed at a desired position. That is, the slider 220 may be a fixed indicator on the spanner bar 133. Each indexing indicator 202, as shown in FIG. 10, may include a guide protrusion 230 fixed to or integrally formed with the spanner bar 133. In this manner, the guide protrusions 230 cooperate with the depression 206 to provide an indication that the seat assembly 100 is located at a desired position, as described above.

Figure 12:
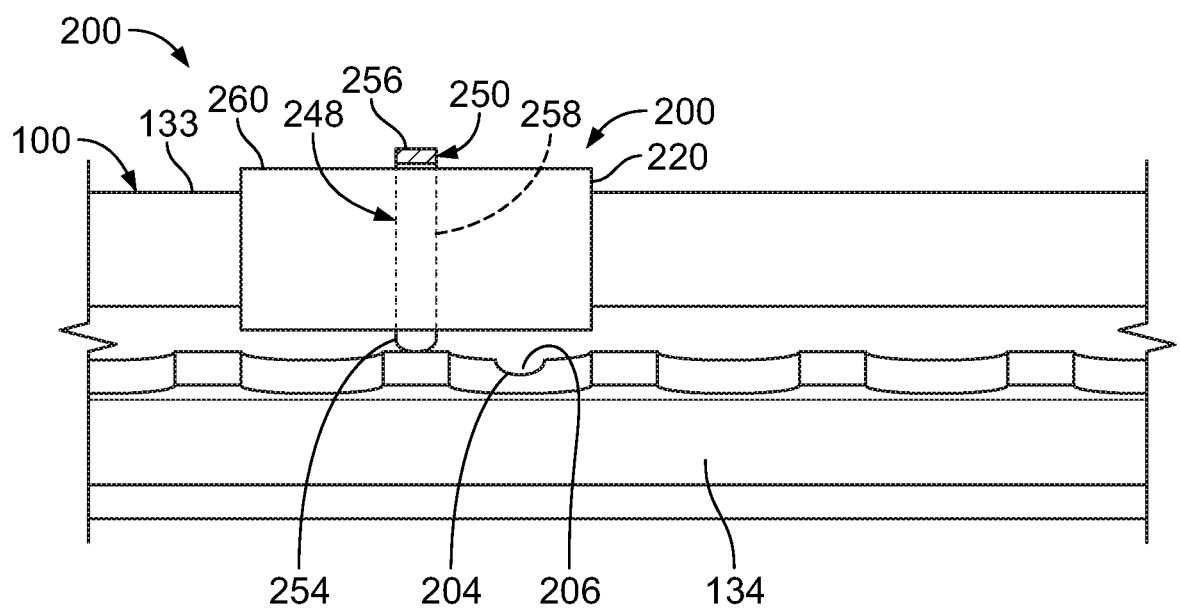
FIG. 12 illustrates a lateral view of the seat indexing system with the seat assembly outside of a desired position, according to an embodiment of the present disclosure.

FIG. 12 illustrates a lateral view of the seat indexing system 200 with the seat assembly 100 outside of a desired position, according to an embodiment of the present disclosure. In this embodiment, the slider 220 is a sleeve that fits around the spanner bar 133. The slider 220 includes a pin passage 248 that slidably retains an indicator pin 250. The indicator pin 250 includes a distal tip 254 connected to a head 256 through a shaft 258.

The distal tip 254 is sized and shaped to fit into the depression 206. When the slider 220 is outside of the desired position, the head 256 extends upwardly out of the pin passage 248 above a top surface 260 of the slider 220, as the distal tip 254 is unable to fit into upper surfaces of the seat track 134 other than the depression 206, and therefore the indicator pin 250 is unable to drop through the pin passage 248. The head 256 may be colored a different color than slider 220, to provide a readily discernable indication that the head 256 is extending above the top surface 260.

Figure 13:
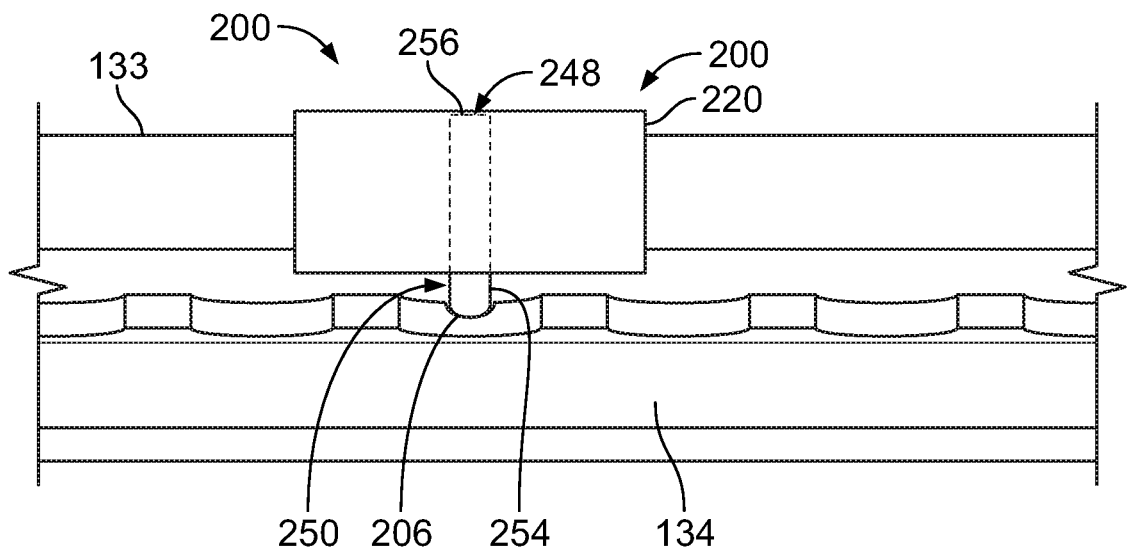
FIG. 13 illustrates a lateral view of the seat indexing system with the seat assembly at the desired position.

FIG. 13 illustrates a lateral view of the seat indexing system 200 with the seat assembly 100 at the desired position. In order to position the seat assembly 100 at the desired position, the slider 220 may first be slid into alignment with an indexing indicator 202 on the spanner bar 133, as described above. When the slider 220 slides over the depression 206, the indicator pin 250 drops into the pin passage 248 due to the distal tip 254 dropping into the depression 206. As such, the head 256 recedes into the pin passage 248 and no longer extends above the top surface 260 of the slider 220, thereby providing a readily discernable indication that the seat assembly 100 is located at the desired position.

In at least one embodiment, the slider 220 shown and described with respect to FIGS. 12 and 13 is used in conjunction with the seat indexing system 200 shown in FIG. 10.

Referring to FIGS. 10, 12, and 13, in at least one other embodiment, the slider 220 may be fixed at a desired position. That is, the slider 220 may be a fixed indicator on the spanner bar 133. Each indexing indicator 202, as shown in FIG. 10, may include a housing including a pin 250 within a pin passage 248. In this manner, the pins 250 cooperate with the depression 206 to provide an indication that the seat assembly 100 is located at a desired position, as described above.

Referring to FIGS. 6-13, the sliders 220 may be positioned over the indexing scale 203 on the spanner bar 133. Each slider 220 may incorporate a witness feature (such as the pin 250, the guide protrusion 230, and/or the like) to confirm a desired location that seats into the depression 206, thereby providing a positive indication and confirmation of the desired location of the seat assembly 100. In at least one embodiment, the slider 220 may include a spring-loaded vertical witness indication pin that is flush at the top of the slider 220 when in alignment with the depression 206, and at other locations, the spring forces the witness indication pin above the top surface to provide an easily identifiable discontinuity at the top of the slider.

Figure 14:
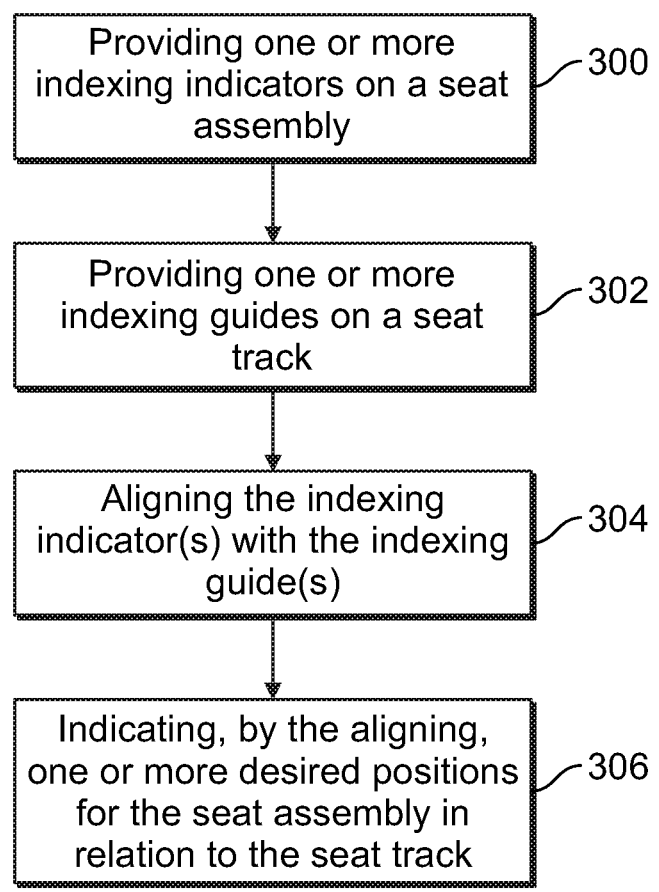
FIG. 14 illustrates a flow chart of a seat indexing method for an internal cabin of a vehicle, according to an embodiment of the present disclosure.

FIG. 14 illustrates a flow chart of a seat indexing method for an internal cabin of a vehicle, according to an embodiment of the present disclosure. The seat indexing method includes providing, at 300, one or more indexing indicators on a seat assembly, providing, at 302, one or more indexing guides on a seat track, aligning, at 304, the indexing indicator(s) with the indexing guide(s), and indicating, at 306, by the aligning at 304, one or more desired positions for the seat assembly in relation to the seat track.

In at least one embodiment, the providing the indexing guide(s) includes forming one or more depressions into the seat track. In at least one embodiment, the providing the indexing indicator(s) on the seat assembly includes positioning the indexing indicator(s) on a spanner bar of the seat assembly.

In at least one embodiment, the seat indexing method also includes providing a slider, and moving the slider in relation to one or both of the seat assembly or the seat track. In at least one embodiment, the seat indexing method also includes aligning an indicator pointer and a guide protrusion of the slider with the indexing indicator(s) and the indexing guide(s), and indicating, by the aligning the indicator pointer and the guide protrusion, the desired position(s) for the seat assembly in relation to the seat track. In at least one embodiment, the providing the slider includes slidably retaining an indicator pin having a distal tip connected to a head through a shaft within a pin passage.

As explained herein, embodiments of the present disclosure provide an efficient systems and methods for identifying proper locations for seats within an internal cabin of a vehicle. Further, embodiments of the present disclosure provide systems and methods that allow for quick and efficient adjustment of seats within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat indexing system for an internal cabin of a vehicle, the seat indexing system comprising:
 a seat assembly including one or more indexing indicators;
 a seat track;
 one or more indexing guides on the seat track, wherein the one or more indexing indicators cooperate with the one or more indexing guides to indicate one or more desired positions for the seat assembly in relation to the seat track; and
 a slider that is configured to move in relation to one or both of the seat assembly or the seat track, wherein the slider comprises:
  an indicator pointer that extends upwardly from a top surface, wherein the indicator pointer is configured to slide over an outer surface of a spanner bar of the seat assembly; and
  a guide protrusion that extends downwardly from a bottom surface, wherein the indicator pointer and the guide protrusion cooperate with the one or more indexing indicators and the one or more indexing guides to indicate the one or more desired positions for the seat assembly in relation to the seat track.

2. The seat indexing system of claim 1, wherein the one or more indexing indicators align with the one or more indexing guides to indicate the one or more desired positions for the seat assembly in relation to the seat track.

3. The seat indexing system of claim 1, wherein the one or more indexing guides are formed on or in the seat track.

4. The seat indexing system of claim 1, wherein the one or more indexing guides include one or more depressions formed into the seat track.

5. The seat indexing system of claim 4, wherein the one or more depressions are formed into at least one retaining lip of the seat track.

6. The seat indexing system of claim 1, wherein the one or more indexing guides include applied visual indicia.

7. The seat indexing system of claim 1, wherein the one or more indexing indicators include a plurality of indexing indicators positioned on an outer surface of the seat assembly, wherein the plurality of indexing indicators provide an indexing scale.

8. The seat indexing system of claim 1, wherein the one or more indexing indicators are positioned on a spanner bar of the seat assembly.

9. The seat indexing system of claim 1, wherein the one or more indexing indicators correspond to one or more particular seat pitch positions in relation to the seat track.

10. The seat indexing system of claim 1, wherein the guide protrusion is configured to seat into the one or more indexing guides.

11. A seat indexing method for an internal cabin of a vehicle, the seat indexing method comprising:
aligning one or more indexing indicators of a seat assembly with one or more indexing guides on a seat track;
indicating, by the aligning, one or more desired positions for the seat assembly in relation to the seat track;
moving a slider in relation to one or both of the seat assembly or the seat track;
aligning an indicator pointer and a guide protrusion of the slider with the one or more indexing indicators and the one or more indexing guides; and
indicating, by the aligning the indicator pointer and the guide protrusion, the one or more desired positions for the seat assembly in relation to the seat track.

12. The seat indexing method of claim 11, wherein the one or more indexing guides comprise one or more depressions formed into the seat track.

13. The seat indexing method of claim 11, wherein the one or more indexing indicators are on a spanner bar of the seat assembly.

14. A seat indexing system for an internal cabin of a vehicle, the seat indexing system comprising:
a seat assembly including a plurality of indexing indicators positioned on an outer surface of the seat assembly, wherein the plurality of indexing indicators provide an indexing scale;
a seat track; and
one or more indexing guides on the seat track, wherein the plurality of indexing indicators cooperate with the one or more indexing guides to indicate one or more desired positions for the seat assembly in relation to the seat track.

15. The seat indexing system of claim 14, wherein the one or more indexing guides are formed on or in the seat track.

16. The seat indexing system of claim 14, wherein the plurality of indexing indicators are positioned on a spanner bar of the seat assembly.

17. The seat indexing system of claim 14, wherein the plurality of indexing indicators correspond to a plurality of particular seat pitch positions in relation to the seat track.

18. A seat indexing system for an internal cabin of a vehicle, the seat indexing system comprising:
a seat assembly including one or more indexing indicators;
a seat track;
one or more indexing guides on the seat track, wherein the one or more indexing indicators cooperate with the one or more indexing guides to indicate one or more desired positions for the seat assembly in relation to the seat track; and
a slider that is configured to move in relation to one or both of the seat assembly or the seat track, wherein the slider comprises a pin passage that slidably retains an indicator pin having a distal tip connected to a head through a shaft.

19. The seat indexing system of claim 18, wherein the head extends above a top surface of a main body of the slider when the indicator pin is not aligned with the one or more indexing guides, and wherein the head recedes into the pin passage as the distal tip seats into the one or more indexing guides.

20. A seat indexing method for an internal cabin of a vehicle, the seat indexing method comprising:
aligning one or more indexing indicators of a seat assembly with one or more indexing guides on a seat track;
indicating, by the aligning, one or more desired positions for the seat assembly in relation to the seat track;
moving a slider in relation to one or both of the seat assembly or the seat track; and
slidably retaining an indicator pin having a distal tip connected to a head through a shaft within a pin passage, wherein the head extends above a top surface of a main body of the slider when the indicator pin is not aligned with the one or more indexing guides, and wherein the head recedes into the pin passage as the distal tip seats into the one or more indexing guides.

* * * * *